United States Patent
Sugiyama et al.

(10) Patent No.: US 9,902,833 B2
(45) Date of Patent: Feb. 27, 2018

(54) PRETREATMENT LIQUID FOR INK JET TEXTILE PRINTING AND TEXTILE PRINTING METHOD

(71) Applicant: SEIKO EPSON CORPORATION, Tokyo (JP)

(72) Inventors: Takako Sugiyama, Tatsuno-machi (JP); Masakazu Ohashi, Shiojiri (JP); Toru Saito, Yamagata-mura (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/633,670

(22) Filed: Feb. 27, 2015

(65) Prior Publication Data

US 2015/0239261 A1 Aug. 27, 2015

(30) Foreign Application Priority Data

Feb. 27, 2014 (JP) ................. 2014-036545

(51) Int. Cl.

| C09D 11/54 | (2014.01) |
|---|---|
| C09D 11/40 | (2014.01) |
| B41J 3/407 | (2006.01) |
| C08K 5/098 | (2006.01) |
| C08K 3/16 | (2006.01) |
| C08K 3/28 | (2006.01) |
| D06P 5/30 | (2006.01) |
| C09D 11/38 | (2014.01) |

(52) U.S. Cl.
CPC .......... *C08K 5/098* (2013.01); *C08K 3/16* (2013.01); *C08K 3/28* (2013.01); *C09D 11/38* (2013.01); *C09D 11/40* (2013.01); *C09D 11/54* (2013.01); *D06P 5/30* (2013.01); *C08K 2003/162* (2013.01); *C08K 2003/166* (2013.01); *C08K 2003/287* (2013.01)

(58) Field of Classification Search
CPC . B41J 3/4078; C08K 3/16; C08K 3/28; C08K 5/098; C08K 2003/287; C08K 2003/162; C08K 2003/166; D06P 5/30
See application file for complete search history.

(56) References Cited

U.S. PATENT DOCUMENTS

| 5,824,142 A | 10/1998 | Yamazaki | |
|---|---|---|---|
| 2003/0103129 A1* | 6/2003 | Tanaka | B41M 5/52 347/105 |
| 2006/0132575 A1* | 6/2006 | Fukuda | B41J 3/4078 347/104 |
| 2007/0067928 A1 | 3/2007 | Ellis | |
| 2007/0103529 A1* | 5/2007 | Pearl | B41J 3/28 347/101 |
| 2010/0091052 A1 | 4/2010 | Ogawa et al. | |
| 2011/0102497 A1 | 5/2011 | Sato et al. | |
| 2011/0200751 A1* | 8/2011 | Yatake | B41J 3/4078 427/261 |
| 2013/0278690 A1* | 10/2013 | Saito | D06P 5/002 347/102 |
| 2013/0302630 A1* | 11/2013 | Ono | C09D 5/02 428/523 |
| 2015/0007749 A1* | 1/2015 | Pal | D21H 19/44 106/287.11 |
| 2016/0122911 A1* | 5/2016 | Franz | C09D 11/322 523/218 |

FOREIGN PATENT DOCUMENTS

| FR | 3007042 A1 * | 12/2014 | ......... D03D 1/0088 |
|---|---|---|---|
| JP | 2009-030014 A | 2/2009 | |
| JP | 2011-105915 A | 6/2011 | |
| JP | 2011105915 A * | 6/2011 | |
| JP | 4969578 B2 | 7/2012 | |
| WO | 2009/084600 A1 | 7/2009 | |

* cited by examiner

*Primary Examiner* — Patrick King
(74) *Attorney, Agent, or Firm* — Nutter McClennen & Fish LLP; John J. Penny, Jr.; Alex Nagorniy

(57) ABSTRACT

A pretreatment liquid for ink jet textile printing according to an aspect of the invention used by being applied to a fabric before applying an ink composition for ink jet textile printing to the fabric includes a multivalent metal salt; and an aqueous medium, in which the concentration of the multivalent metal salt is within in a range of 0.025 mol/kg or more and 0.08 mol/kg or less. A textile printing method according to another aspect the invention includes applying a pretreatment liquid to at least a partial region of a fabric; and applying an ink composition for ink jet textile printing to at least a portion of the region to which the pretreatment liquid is applied.

16 Claims, No Drawings

PRETREATMENT LIQUID FOR INK JET TEXTILE PRINTING AND TEXTILE PRINTING METHOD

BACKGROUND

1. Technical Field

The present invention relates to a pretreatment liquid for ink jet textile printing and a textile printing method.

2. Related Art

Textile printing methods with which recording an image with respect to fabrics such as textiles, knitted fabrics, and non-woven fabrics is performed are known in the related art. Although screen textile printing methods and the like are widely used as textile printing methods, in recent years, utilizing ink jet recording methods has been investigated from the viewpoint of being able to more effectively use the ink used in the textile printing. Specifically, in a textile printing method using the ink jet recording method (below, referred to as "ink jet textile printing method"), an image is recorded on a fabric by an ink composition for ink jet textile printing formed in liquid droplet form is discharged from the nozzles of a head, thereby being attached to the fabric.

In such ink jet textile printing, pretreatment method in which a pretreatment liquid that contains a coagulant (such as a multivalent metal salt, an organic acid, a cationic compound) is applied in advance to the fabric is known in order for the color development or the like of the recorded image to be improved.

For example, JP-T-2009-084600 discloses a processing liquid for ink jet textile printing containing a water-soluble multivalent metal salt, a surfactant, and an aqueous medium. According to JP-T-2009-084600, a printed product is obtained with excellent texture in the printed part of the fabric, image concentration, durability of the ink coating film, and color fastness to washing.

JP-A-2009-30014 discloses a method of manufacturing a textile printed product that includes a step for using the pretreatment liquid containing a multivalent metal salt, and a step for printing ink for ink jet textile printing that contains a specified anionic resin. According to JP-A-2009-30014, it is possible to realize favorable concealment in a case of using a dark colored fabric or the like, along with the color fastness to washing and the rubbing fastness being favorable.

Japanese Patent No. 4969578 discloses a textile printing method that includes a step for performing pretreatment of the fabric using a pretreatment solution that includes an aqueous multivalent cationic salt solution, a step for printing using an aqueous white pigmentized ink jet ink with respect to the treated fabric, and a step for digitally printing on white ink using an aqueous color ink jet ink.

Since a large amount of the multivalent metal salt included in the pretreatment liquid remains on the surface when applied to the fabric by increasing the content of the multivalent metal salt, it is possible to improve the aggregation action of the pigment or the like included in the ink composition. However, due to the multivalent metal salt that remains on the surface of the fabric, the pigment included in the ink composition becomes easily dropped from the fabric and a defect easily arises of the color fastness to washing of the image being lowered. For this reason, in a case of using a pretreatment liquid disclosed in JP-T-2009-084600, JP-A-2009-30014, and Japanese Patent No. 4969578, even though it is possible to improve the color development of the recorded image using the ink composition, the color fastness to washing of the image cannot be said to be sufficient.

SUMMARY

An advantage of some aspects of the invention is to provide a pretreatment liquid for ink jet recording able to form an image with excellent color fastness to washing and color development, and a textile printing method using the same.

The invention can be realized in the following forms or application examples.

APPLICATION EXAMPLE 1

According to an aspect of the invention, there is provided a pretreatment liquid for ink jet textile printing that is applied to a fabric before applying an ink composition for ink jet textile printing to the fabric and that includes a multivalent metal salt; and an aqueous medium, in which the concentration of the multivalent metal salt is within in a range of 0.025 mol/kg or more and 0.08 mol/kg or less.

APPLICATION EXAMPLE 2

According to another aspect of the invention, there is provided a pretreatment liquid for ink jet textile printing that is used by being applied to a fabric before applying an ink composition for ink jet textile printing to the fabric and that includes a multivalent metal salt; and an aqueous medium, in which the concentration of the multivalent metal salt is within in a range of 0.025 mol/kg or more and 0.08 mol/kg or less when the pretreatment liquid is applied to the fabric.

APPLICATION EXAMPLE 3

In the pretreatment liquid for ink jet textile printing according to Application Example 1 or 2, it is preferable that a concentration of the multivalent metal salt be within a range of 0.03 mol/kg or more and 0.07 mol/kg or less.

APPLICATION EXAMPLE 4

In the pretreatment liquid for ink jet textile printing according to any one of Application Examples 1 to 3, it is preferable that the metal ions that configure the multivalent metal salt be at least one of calcium ions and magnesium ions.

APPLICATION EXAMPLE 5

In the pretreatment liquid for ink jet textile printing according to any one of Application Examples 1 to 4, it is preferable that anions that configure the multivalent metal salt be chlorine ions.

APPLICATION EXAMPLE 6

In the pretreatment liquid for ink jet textile printing according to any one of Application Examples 1 to 5, it is preferable that the content of resin be 3.5 mass % or less.

APPLICATION EXAMPLE 7

According to still another aspect of the invention, there is provided a textile printing method including applying the pretreatment liquid according to any one of Application Examples 1 to 6 to at least a partial region of a fabric; and applying an ink composition for ink jet textile printing to at least a portion of the region to which the pretreatment liquid is applied.

APPLICATION EXAMPLE 8

In the textile printing method according to Application Example 7, it is preferable that method further include heating the ink composition applied to the fabric.

APPLICATION EXAMPLE 9

In the textile printing method according to Application Example 8, it is preferable that the heating temperature in the heating be 160° C. or more and 200° C. or less.

APPLICATION EXAMPLE 10

In the textile printing method according to any one of Application Examples 7 to 9, it is preferable that the attachment amount of the multivalent metal salt included in the pretreatment liquid applied to the fabric be 1.6 $\mu$mol/cm$^2$ or more and 6 $\mu$mol/cm$^2$ or less.

APPLICATION EXAMPLE 11

In the textile printing method according to any one of Application Examples 7 to 10, it is preferable that the method be performed using a fabric with a brightness (L*) of 70 or more.

APPLICATION EXAMPLE 12

In the textile printing method according to any one of Application Examples 7 to 11, it is preferable that the attachment amount of the ink composition applied to the fabric be 1.5 mg/cm$^2$ or more and 6 mg/cm$^2$ or less.

APPLICATION EXAMPLE 13

In the textile printing method according to any one of Application Example 7 to 12, it is preferable that the ink composition contain a coloring material other than a white coloring material.

DESCRIPTION OF EXEMPLARY EMBODIMENTS

Below, favorable embodiments of the invention will be described. The embodiments described below describe an example of the invention. The invention is not limited by the embodiments below and includes various modifications carried out in a range not departing from the gist of the invention.

1. Pretreatment Liquid For Ink Jet Textile Printing

The pretreatment liquid for ink jet textile printing according to an embodiment of the invention is used by being applied to a fabric before applying an ink composition for ink jet textile printing to the fabric, and includes a multivalent metal salt; and an aqueous medium, and the concentration of the multivalent metal salt is within in a range of 0.025 mol/kg or more and 0.08 mol/kg or less.

At least when the pretreatment liquid according to the embodiment is applied to a fabric, the concentration of the multivalent metal salt needs to be within this range. That is, in cases where the pretreatment liquid is distributed on the market, the concentration of the multivalent metal salt may be outside the range, the concentration of the multivalent metal salt is adjusted at least during use, and the content of the multivalent metal salt may be brought within the range. Specifically, in a case in which the pretreatment liquid is distributed on the market in a concentrated state, it is possible for the pretreatment liquid to be used by being diluted by an aqueous medium (for example, water) during use (when the pretreatment liquid is applied to the fabric), and the concentration of the multivalent metal salt adjusted to be within the range. In this way, it is preferable that a concentrated type of pretreatment liquid with a high concentration of the multivalent metal salt be used, on the point of improved transport efficiency of the pretreatment liquid. Alternatively, a diluted type pretreatment liquid may also be used in which a pretreatment liquid is distributed on the market in a diluted state, and, when using the pretreatment liquid (when the pretreatment liquid is applied to the fabric), the aqueous medium is evaporated and the concentration of the multivalent metal salt adjusted to be within the range.

Below, the components included in the pretreatment liquid for ink jet textile printing according to the embodiment and components able to be included will be described in detail. Below, the concentration and content of each component described indicates the concentration or content when the pretreatment liquid is applied to a fabric.

1.1. Multivalent Metal Salt

The pretreatment liquid according to the embodiment contains a multivalent metal salt. The multivalent metal salt has a function of aggregating the pigment by reacting with the pigment or the like included in the ink composition for ink jet textile printing described later. In so doing, it is possible for the color development of the image recorded with the ink composition to be improved.

The multivalent metal salt is a compound configured from bivalent or higher metal ions and anions. Examples of the bivalent or higher metal ion include, for example, ions of calcium, magnesium, copper, nickel, zinc, barium, aluminum, titanium, strontium, chromium, cobalt and iron. Among these metal ions that configure the multivalent metal salt, at least one of calcium ions and magnesium ions are preferable, and calcium ions are more preferable, from the viewpoint of aggregability of the pigment or the like.

Examples of the anions that configure the multivalent metal salt include chlorine ions, bromine ions, iodine ions, nitrate ions, sulfate ions, acetate ions, carbonate ions, and hydroxide ions. Among these, inorganic ions are preferable from the viewpoint of ability to suppress odor, and chlorine ions are more preferable from the viewpoint of ability to suppress color changes or the like.

Specific examples of the multivalent metal salt include calcium chloride, calcium nitrate, calcium sulfate, calcium acetate, calcium hydroxide, calcium carbonate, magnesium chloride, magnesium acetate, magnesium sulfate, magnesium carbonate, barium sulfate, barium chloride, zinc sulfide, zinc carbonate, and copper nitrate. These multivalent metal salts may be used singly, or two or more types may be used together. It is preferable that the multivalent metal salt be water-soluble (specifically, solubility with respect to 100 mL of water at 20° C. is 10 g or more).

Although it is necessary that the concentration of the multivalent metal salt included in the pretreatment liquid be within a range of 0.025 mol/kg or more and 0.08 mol/kg or less, it is preferable that the concentration be within a range of 0.03 mol/kg or more and 0.07 mol/kg or less, and more preferably be within a range of 0.04 mol/kg or more and 0.06 mol/kg. By the concentration of the multivalent metal salt being within the range, it is possible to obtain an image that satisfies the balance between color development and the color fastness to washing at a high level. On the other hand, when the concentration of the multivalent metal salt is less than 0.025 mol/kg, the color development of the recorded image is lowered. When the concentration of the multivalent metal salt exceeds 0.08 mol/kg, the color fastness to washing of the recorded image has a tendency towards lowering. In the invention, the concentration [mol/kg] of the multivalent metal salt included in the pretreatment liquid is calculated by subtracting the amount of substance [mol] of the multivalent metal salt included in the pretreatment liquid from the total mass (that is including the multivalent metal salt) [kg] of the pretreatment liquid.

1.2. Aqueous Medium

The pretreatment liquid according to the embodiment contains an aqueous medium. The aqueous medium functions as a medium in which the multivalent metal salt is dissolved or dispersed. In the embodiment, the wording "aqueous medium" is a medium arbitrarily mixed with water. The aqueous medium contains at least one of water and a water-soluble organic solvent, containing water is preferable, and containing 30 mass % or more of water with respect to the total mass (100 mass %) of the aqueous medium is more preferable. In addition to water and the water-soluble organic solvent, a surfactant, a resin, or the like may be included.

1.2.1. Water

It is preferable that the water be one for which ionic impurities have been removed such as pure water or ultra-pure water such as ion-exchanged water, ultrafiltration water, reverse osmosis water, and distilled water. Further, using water sterilized by ultraviolet irradiation, the addition of hydrogen peroxide, or the like is suitable since it is possible to prevent the generation of mold and bacteria in the case of long-term storage of the pretreatment liquid.

It is possible for the content of water included in the pretreatment liquid to be, for example, 50 mass % or more with respect to the total mass of the pretreatment liquid, and may be 60 mass % or more.

1.2.2. Organic Solvent

Examples of the organic solvent include 1,2-alkane diols, polyhydric alcohols, pyrrolidone derivatives, and glycol ethers.

Examples of the 1,2-alkane diol include 1,2-propanediol, 1,2-butanediol, 1,2-pentanediol, 1,2-hexanediol, and 1,2-octanediol. The 1,2-alkane diols improve the wettability with respect to the fabric, and have excellent action of uniformly wetting. In a case of containing 1,2-alkane diols, it is possible for the content thereof to be 1 mass % or more to 20 mass % or less with respect to the total mass of the pretreatment liquid.

Examples of the polyhydric alcohols include, ethylene glycol, diethylene glycol, triethylene glycol, propylene glycol, dipropylene glycol, 1,3-propanediol, 1,4-butanediol, 1,6-hexanediol, trimethylolpropane, and glycerin. In a case in which the pretreatment liquid is discharged from the ink jet recording head, it is possible for the polyhydric alcohols to suppress drying and solidifying of the pretreatment liquid in the nozzle surface of the head. In a case of containing a polyhydric alcohol, it is possible for the content to be 1 mass % or more to 30 mass % or less with respect to the total mass of the pretreatment liquid.

Examples of the pyrrolidone derivatives include N-methyl-2-pyrrolidone, N-ethyl-2-pyrrolidone, N-vinyl-2-pyrrolidone, 2-pyrrolidone, N-butyl-2-pyrrolidone, and 5-methyl-2-pyrrolidone. In a case of containing a resin in the pretreatment liquid, it is possible for the pryrrolidone derivatives to act as a good solvent for the resin.

Examples of the glycol ethers include ethylene glycol mono-isobutyl ether, ethylene glycol mono-hexyl ether, ethylene glycol mono-iso-hexyl ether, diethylene glycol mono-hexyl ether, triethylene glycol monobutyl ether, triethylene glycol mono-hexyl ether, diethylene glycol mono-iso-hexyl ether, triethylene glycol mono-iso-hexyl ether, ethylene glycol mono-iso-heptyl ether, diethylene glycol mono-iso-heptyl ether, triethylene glycol mono-iso-heptyl ether, ethylene glycol mono-octyl ether, ethylene glycol mono-iso-octyl ether, diethylene glycol mono-iso-octyl ether, triethylene glycol mono-iso-octyl ether, ethylene glycol mono-2-ethylhexyl ether, diethylene glycol mono-2-ethylhexyl ether, triethylene glycol mono-2-ethylhexyl ether, diethylene glycol mono-2-ethylpentyl ether, ethylene glycol mono-2-ethylpentyl ether, ethylene glycol mono-2-ethylhexyl ether, diethylene glycol mono-2-ethylhexyl ether, ethylene glycol mono-2-methylpentyl ether, diethylene glycol mono-2-methylpentyl ether, propylene glycol monobutyl ether, dipropylene glycol monobutyl ether, tri-propylene glycol monobutyl ether, propylene glycol monopropyl ether, dipropylene glycol monopropyl ether, and tripropylene glycol monomethyl ether. It is possible to use one type individually or use a mixture of two or more types. It is possible for the glycol ethers to suppress wettability or the like of the pretreatment liquid with respect to the recording medium.

1.2.3. Surfactant

Although the surfactant is not limited to the following, examples thereof include acetylene glycol-based surfactants, acetylene alcohol-based surfactants, polysiloxane-based surfactants, and fluorine-based surfactants. By the pretreatment liquid including these surfactants, there are cases where the drying properties of the pretreatment liquid attached to the fabric are favorable. Among these, because the solubility in the pretreatment liquid is favorable, a polysiloxane-based surfactant is preferable.

Although not limited to the following, examples of the acetylene glycol-based surfactant and the acetylene alcohol-based surfactant include 2,4,7,9-tetramethyl-5-decyne-4,7-diol, and alkylene oxide adducts of 2,4,7,9-tetramethyl-5-decyne-4,7-diol, and 2,4-dimethyl-5-decyne-4-ol, and alkylene oxide adducts of 2,4-dimethyl-5-decyne-4-ol. These are available as commercial products, such as the E series, such as the Olefin 104 series or Olefin E1010 (product names, manufactured by Air Products and Chemicals, Inc.), or Surfynol 465 and Surfynol 61 (product names, manufactured by Nissin Chemical Industry Co., Ltd).

Although not particularly limited, it is preferable that examples of the silicone-based surfactant include polysiloxane-based compounds. Although not particularly limited, examples of the polysiloxane-based compound include a polyether-modified organosiloxane. Examples of the commercially available polyether-modified organosiloxanes include BYK-306, BYK-307, BYK-333, BYK-341, BYK-345, BYK-346, BYK-347, and BYK-348 (product name, manufactured by BYK Japan K.K.), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (product names, manufactured by Shin-Etsu Chemical Co., Ltd.).

It is preferable that a fluorine modified polymer be used as the fluorine-based surfactant, and specific examples include BYK-340 (manufactured by BYK-Chemie Japan K.K.).

The surfactant may be used singly or two or more types may be used together. Although not particularly limited, it is possible for the content in a case of containing the content of the surfactant to be 0.05 mass % or more to 1 mass % or less with respect to the total mass of the pretreatment liquid.

1.2.4. Resin

Although the pretreatment liquid according to the embodiment may contain a resin from the viewpoint of the color fastness to washing of the recorded image being significantly improved, it is preferable that the content of the resin be reduced from the viewpoint of improving the texture of the fabric. Specifically, it is preferable that the content of the resin be 3.5 mass % or less in terms of solid content conversion with respect to the total mass of the pretreatment liquid, 3 mass % or less is more preferable, 2 mass % or less is still more preferable, 1 mass % or less is yet more preferable, and not being contained at all (0 mass %) is particularly preferable. Since the pretreatment liquid according to the embodiment has a concentration of multivalent metal salt which lowers the color fastness to washing of the image within the specified range, it is possible to record an image with excellent color fastness to washing. Therefore, it is possible to ensure sufficient color fastness to washing of the image even when the content of the resin included in the pretreatment liquid is reduced or is not contained at all.

Examples of the resin include acrylic-based resins, styrene acrylic-based resins, fluorene-based resins, urethane-based resins, polyolefin-based resins, rosin modified resins, terpene-based resins, polyester-based resins, polyamide-based resins, epoxy-based resins, vinyl chloride-based resins, and vinyl acetate resins. Although it is possible to use these resins in either of an emulsion state or a solution state, from the viewpoint of suppressing a rise in the viscosity of the pretreatment liquid, it is preferable that the resin in an emulsion state be used.

1.2.5. Other Components

The aqueous medium may contain, as necessary, a paste, a pH adjuster, a preservative, fungicide, or the like.

Paste

Although not limited to the following, examples of the paste include starch substances, such as corn and wheat, cellulose-based substances, such as carboxymethyl cellulose and hydroxymethyl cellulose, polysaccharides, such as sodium alginate, gum arabic, locust bean gum, trant gum, guar gum and tamarind seed, proteins, such as gelatin and casein, natural water-soluble polymers, such as tannins and lignins, and synthetic water soluble polymers such as polyvinyl alcohol compounds, polyethylene oxide compounds, acrylic compounds and maleic anhydride compounds.

The paste may be used singly or two or more types may be used together. Although not particularly limited, it is possible for the content of the paste to be 0.1 mass % or more and 20 mass % or less with respect to the total mass of the pretreatment liquid.

pH Adjuster

Examples of the pH adjuster include potassium dihydrogen phosphate, disodium hydrogen phosphate, sodium hydroxide, lithium hydroxide, potassium hydroxide, ammonia, diethanolamine, triethanolamine, triisopropanolamine, potassium carbonate, sodium carbonate, sodium hydrogen carbonate and the like.

Preservative, Fungicide

Examples of the preservative and fungicide include sodium benzoate, sodium pentachlorophenolate, 2-pyridinethiol-1-sodium oxide, sodium sorbate, dehydro sodium acetate, and 1,2-dibenzinethiazolin-3-on (Proxel CRL, Proxel BDN, Proxel GXL, Proxel XL-2, and Proxel TN by ICI PLC).

1.3. Properties of Pretreatment Liquid

From the viewpoint of improving the discharge properties from the nozzles in a case of using spray coating, and improving the coating properties in a case of using roller coating, it is preferable that the viscosity at 20° C. of the pretreatment liquid according to the embodiment be 30 mPa·s or less, 25 mPa·s or less is more preferable, 20 mPa·s or less is still more preferable, 15 mPa·s or less is particularly preferable, 10 mPa·s or less is even more preferable, and 5 mPa·s or less is even more preferable still. Although the lower limit is not limited, 1 mPa·s or more is preferable. Measurement of viscosity is possible by measuring the viscosity in an environment of 20° C. using a viscoelasticity tester MCR-300 (product name, manufactured by Pysica Co., Ltd.).

2. Textile Printing Method

A textile printing method according to an embodiment of the invention includes a pretreatment step for applying the above-described pretreatment liquid to at least a partial region of a fabric; and an ink application step for applying an ink composition for ink jet textile printing to at least a portion of the region to which the pretreatment liquid is applied.

Below, the ink composition for ink jet textile printing, fabric and textile printing method will be described in order for the textile printing method according to the embodiment.

2.1. Ink Composition for Ink Jet Textile Printing 2.1.1. Coloring Material

The ink composition according to the embodiment contains a coloring material. Examples of the coloring material include white coloring materials and coloring materials other than the white coloring material.

Although not limited to the following, examples of the white coloring material include white pigments such as white inorganic pigments (for example, titanium oxide, zinc oxide, zinc sulfide, antimony oxide, and zirconium oxide), and white organic pigments (for example, white hollow resin particles and polymer particles).

The term "coloring material other than the white coloring material" indicates a coloring material except for the while coloring materials described above, and it is preferable that a pigment other than the white coloring material be used.

Although not limited to the following, it is possible to use organic pigments, such as azo-based, phthalocyanine-based, dye-based, fused polycyclic-based, nitro-based, and nitroso-based (Brilliant Carmine 6B, Lake Red C, Watching Red, Disazo Yellow, Hansa Yellow, phthalocyanine blue, phthalocyanine green, alkali blue, aniline black or the like), metals such as cobalt, iron, chromium, copper, zinc, lead, titanium, vanadium, manganese, and nickel, metal oxides and sulfides, as well as carbon blacks (C.I. Pigment Black 7), such as furnace carbon black, lamp black, acetylene black, and channel black and even inorganic pigments such as ocher, ultramarine blue, and Prussian blue as the pigment other than the white coloring material. These pigments may be used singly, or two or more types may be used together.

The ink composition containing a white coloring material is mainly used in textile printing with respect to a fabric with a low brightness (for example, a black or dark blue fabric), and is frequently used in order to form an underlayer of the ink composition containing a coloring material other than the white coloring material. In a case of forming the underlayer, because the implantation amount is large compared to the implantation amount of ink used for forming the image thereon, the resin amount included in the underlayer increases. Therefore, in a case of using an ink composition containing the white coloring material, even though a lowering of the color fastness to washing accompanies an increase in the content of the multivalent metal salt, the lowering of the color fastness to washing is small compared to a case of using the ink composition containing the coloring material other than the white coloring material.

Meanwhile, in a case of using the ink composition containing a coloring material other than the white coloring material, the lowering of the color fastness to washing particularly easily becomes a problem. That is, in a case of recording an image on a fabric (described later) with a high brightness, the image is frequently formed by directly applying the ink composition containing a coloring material other than the white coloring material on the fabric without forming the underlayer. In this case, since the implantation amount of the ink composition containing a coloring material other than the white coloring material used for forming the image is small, the resin amount included in the obtained image is reduced, and the lowering of the color fastness to washing becomes particularly remarkable.

With respect to such a problem, in the textile printing method according to the embodiment, since a fabric pretreated using the above-described pretreatment liquid is used, it is possible to record an image with excellent color fastness to washing and color development even in a case of using an ink composition containing a coloring material other than the white coloring material. Accordingly, the textile printing method and the above-described pretreatment liquid according to the embodiment are able to better exhibit the effects when using the ink composition including the coloring material other than the white coloring material.

Since favorable color development is ensured for different compositions according to the type of coloring material used, it is possible to make the content of the coloring material 1 mass % or more and 30 mass % or less with respect to the total mass of the ink composition, to make the content 1 mass % or more and 15 mass % or less, and further make the content 5 mass % or more and 13 mass % or less.

In a case of using the pigment as the coloring material, the pigment may be a pigment subjected to surface treatment, or may be a pigment using a dispersant or the like, from the viewpoint of increasing the dispersibility in ink. The pigment subjected to surface treatment is able to be dispersed in an aqueous medium by a hydrophilic group (such as a carboxyl group and a sulfonate group) being directly or indirectly bonded to the pigment surface by physical or chemical treatment (below, referred to as a "self-dispersing pigment"). The pigment using the dispersant has the pigment dispersed by a surfactant or a resin (below, referred to as "polymer dispersed pigment".) and it is possible for any well-known substance to be used as the surfactant or resin. Pigments coated by a resin are also included in the "polymer dispersed pigment". It is possible for the pigment coated by a resin to be obtained by an acid precipitation method, a phase inversion emulsification method, a mini-emulsion polymerization, or the like.

2.1.2. Resin

The ink composition according to the embodiment contains a resin. The resin includes a function of improving the fixing properties of the image formed by the ink composition, and it is possible for the color fastness to washing of the image to be improved.

Since it is possible for the resin to use the same resin given as an example in the above-described pretreatment liquid, the example will not be repeated. It is preferable that an emulsion type resin be used, from the viewpoint of being able to improve the abrasion resistance of the coating, the adhesiveness, and the storage stability of the ink. Although the resin included in the ink composition according to the embodiment may be a self-emulsifying type in which a necessary hydrophilic component is introduced in order to be stably dispersed in water, or may be water dispersible due to use of an external emulsifier, it is preferable that the self-emulsifying dispersion (self-emulsifying type emulsion) not including an emulsifier be used, from the viewpoint of a reaction with the multivalent metal salt included in the pretreatment liquid described above not being easily inhibited.

It is preferable that the content of the resin be 2 mass % or more and 25 mass % or less in terms of solid content conversion with respect to the total mass (100 mass %) of the ink composition, 2.5 mass % or more and 20 mass % or less is more preferable, and 3 mass % or more and 15 mass % or less is still more preferable. By making the content of the resin 3 mass % or more, there is a tendency toward the fixing properties of the recorded image improving, and by making the content of the resin 15 mass % or less, there is a tendency for the discharge stability of the recording head and the storage stability of the ink composition becoming favorable.

2.1.3. Water

The ink composition according to the embodiment contains water. Since the preferably used waters are the same as described in the pretreatment liquid, description thereof will not be repeated. It is possible for the content of water to be made 50 mass % or more with respect to the total mass of the ink composition.

2.1.4. Organic Solvent

The ink composition according to the embodiment may contain an organic solvent. The organic solvent has functions of increasing the adhesiveness of ink with respect to the fabric, suppressing the drying of the head of the ink jet recording apparatus and the like. Since it is possible to use the same specific examples of the organic solvent as the organic solvents given as examples in the description of the pretreatment liquid, description thereof will not be repeated. Although not particularly limited, it is possible for the content of the organic solvent to be made 1 mass % or more and 40 mass % or less with respect to the total mass of the ink composition.

2.1.5. Surfactant

The ink composition according to the embodiment may include a surfactant. The surfactant includes a function of lowering the surface tension of the ink composition, thereby increasing the wettability of the fabric, or the like. Among the surfactants, it is preferable that acetylene glycol-based surfactants, acetylene alcohol-based surfactants, silicone-based surfactants, and fluorine-based surfactants be used. Since it is possible to use the same specific examples of the surfactant as the surfactants given as examples in the description of the pretreatment liquid, description thereof will not be repeated. Although not particularly limited, it is possible for the content of the surfactant to be made 0.1 mass % or more and 1.5 mass % or less with respect to the total mass of the ink composition.

2.1.6. Other Components

The ink composition according to the embodiment may contain, as necessary, pH adjusters, fungicides or preservatives, rust inhibitors, chelating agents and the like. Since the specific examples of these components are the same as those given as examples in the above-described pretreatment liquid, description thereof will not be repeated.

2.1.7. Physical Properties of Ink Composition

It is preferable that the ink composition according to the embodiment have a surface tension at 20° C. of 20 mN/m or more to 40 mN/m, and from 25 mN/m or more to 35 mN/m or less, from the viewpoint of a balance between the image quality and the reliability as an ink for ink jet recording. It is possible for measurement of the surface tension to be performed by confirming the surface tension when a platinum plate is wetted with the ink in an environment of 20° C. using an Automatic Surface Tensiometer CBVP-Z (product name, manufactured by Kyowa Interface Science Co., Ltd.).

From the same viewpoint, it is preferable that the viscosity at 20° C. of the ink composition according to the embodiment be from 3 mPa·s or more to 10 mPa·s or less, and from 3 mPa·s or more to 8 mPa·s or less is more preferable. Measurement of viscosity is possible by measuring the viscosity in an environment of 20° C. using a viscoelasticity tester MCR-300 (product name, manufactured by Pysica Co., Ltd.).

2.2. Fabric

The textile printing method according to the embodiment is performed using the fabric. Examples of the materials that configure the fabric are not limited and include natural fibers such as cotton, hemp, wool, and silk, synthetic fibers such as polypropylene, polyester, acetate, triacetate, polyamide, and polyurethane, and biodegradable fibers, such as polylactide, and mixed fibers thereof may be used. As the fabric, the fibers given above may have any form, such as woven, knitted and unwoven.

As described above, in a case of recording an image on a fabric with a high brightness, the image is frequently formed by directly applying the ink composition containing a coloring material other than the white coloring material on the fabric without forming the underlayer. In this case, since the implantation amount of the ink composition containing a coloring material other than the white coloring material used for forming the image is small, the resin amount included in the obtained image is reduced, and a remarkable lowering of the color fastness to washing arises.

With respect to such a problem, in the textile printing method according to the embodiment, since a pretreatment step using the above-described pretreatment liquid is included, it is possible to record an image with excellent color fastness to washing and color development using an ink composition containing a coloring material other than the white coloring material with respect to the fabric with a high brightness. That is, it is possible for the textile printing method according to the embodiment and the above-described pretreatment liquid to better exhibit these effects, when forming the image with respect to a fabric with a high brightness.

The term "fabric with a high brightness" specifically signifies a fabric with a brightness (L*) of 70 or more, and examples include fabrics having a neutral color or a light color phase such as white, grey, yellow, lime green, aqua, and pink. It is possible for the brightness (L*) to be measure using a Spectrolino (trade name, manufactured by Gretag-Macbeth Co., Ltd.) spectrophotometer.

2.3. Textile Printing Method

Next, each step of the textile printing method according to the embodiment will be described.

2.3.1. Pretreatment Step

The pretreatment step is a step for applying the above-described pretreatment liquid to at least a partial region of the fabric.

In the pretreatment step, it is preferable that application be performed so that the attachment amount of the pretreatment liquid is 0.02 g/cm$^2$ or more and 0.5 g/cm$^2$ or less, 0.02 g/cm$^2$ or more and 0.24 g/cm$^2$ or less is more preferable, and 0.03 g/cm$^2$ or more and 0.08 g/cm$^2$ or less is still more preferable. By making the attachment amount of the pretreatment liquid 0.02 g/cm$^2$ or more, since the pretreatment liquid is easily uniformly coated with respect to the fabric, it is possible to suppress color unevenness in the image. By making the attachment amount of the pretreatment liquid 0.5 g/cm$^2$ or less, it is possible to suppress bleeding of the image.

In the pretreatment step, it is preferable that application be performed so that the attachment amount of the multivalent metal salt included in the pretreatment liquid applied to the fabric is 1.6 μmol/cm$^2$ or more and 6 μmol/cm$^2$ or less, and 2 μmol/cm$^2$ or more and 5 μmol/cm$^2$ or less is more preferable. By performing application so that the attachment amount of the multivalent metal salt is 1.6 μmol/cm$^2$ or more, the color development of the recorded image becomes favorable. By performing application so that the attachment amount of the multivalent metal salt is 6 μmol/cm$^2$ or less, the color fastness to washing of the recorded image becomes favorable.

Examples of the method for applying the pretreatment liquid to the fabric include a method of immersing the fabric in the pretreatment liquid (immersion coating), a method of coating the pretreatment liquid with a roll coater or the like (roller coating), a method of ejecting the pretreatment liquid with a spray device (spray coating), and a method of ejecting the pretreatment liquid with an ink jet method (ink jet coating), and any of the these methods may be used. Among these, it is preferable that immersion coating, roller coating and spray coating be used, from the viewpoint of the simplicity of device configuration and rapidly performing application of the pretreatment liquid.

The textile printing method according to the embodiment may include a pretreatment liquid drying step for drying the pretreatment liquid applied to the fabric after the pretreatment step. Although drying of the pretreatment liquid may be performed by natural drying, it is preferable that the drying accompany heating from the viewpoint of improving the drying speed. In a case of heating accompanying drying in the drying step of the pretreatment liquid, although the heating method thereof is not particularly limited, examples include a heat press method, a normal pressure steam method, a high pressure steam method and a thermofixing method. Examples of the heat source of the heating include, but are not limited to, infrared rays (lamp).

2.3.2. Ink Application Step

The ink application step is a step for applying an ink composition for ink jet textile printing to at least a partial region to which the pretreatment liquid is applied by the pretreatment step. In so doing, by reacting the component of the coloring material or the like included in the ink composition and the multivalent metal salt, since the component of the coloring material or the like aggregates on the fabric, an image with excellent color development is obtained. Since the pretreatment liquid in which the concentration of the multivalent metal salt is within a specified range is used, the color fastness to washing of the recorded image becomes favorable.

The ink application step is a step for printing the image on the fabric by discharging liquid droplets of the ink composition from the nozzles of an ink jet recording head, and attaching the liquid droplets to the fabric. In so doing, a printed product is obtained on which an image formed from an ink composition on the fabric is printed.

Any method of ink jet recording method in which an ink composition is discharged may be used, and examples thereof include a charge deflection method, a continuous method, and an on-demand method (piezoelectric method, bubble jet (registered trademark) method). Among these ink jet recording methods, a method using a piezoelectric-type ink jet recording apparatus is particularly preferable.

In the ink application step, it is preferable that application be performed so that the attachment amount of the ink composition is 1.5 mg/cm² or more and 6 mg/cm² or less, and 2 mg/cm² or more and 5 mg/cm² or less is more preferable. By the attachment amount of the ink composition being 1.5 mg/cm², there is a tendency for the color development of the recorded image to be favorable, and by the attachment amount of the ink composition being 6 mg/cm² or less, the drying properties of the recorded image become favorable, and it is possible to suppress bleeding of the image.

2.3.3. Heating Step

The textile printing method according to the embodiment may include a heating step for heating the ink composition (image) attached to the fabric.

Although not particularly limited, examples of the heating method with which the ink composition applied to the fabric is heated include a heat press method, a normal pressure steam method, a high pressure steam method, and a thermofixing method. Examples of the heat source of the heating include, but are not limited to, infrared rays (lamp).

Although not limited thereto, it is preferable that the heating temperature when heating the ink composition attached to the fabric be 150° C. or more and 200° C. or less, and 160° C. or more and 180° C. or less is more preferable. By the heating temperature being within the above range, it is possible to reduce damage to the fabric, and to promote forming as a film of the resin included in the ink composition. The "heating temperature" in the heating step refers to the temperature of the image surface formed on the fabric, and it is possible to measure the temperature using a non-contact thermometer (product name "IT2-80", manufactured by Keyence Corporation).

Although not limited thereto, it is possible for the heating time to be 30 seconds or more and 20 minutes or less.

3. Examples

Below, although the embodiment of the invention is more specifically described using the examples, the embodiment is not limited to only these examples.

3.1. Preparation of Pretreatment Liquid

Each component was mixed and stirred so as to have the blending ratio in Table 1, and the pretreatment liquids P1 to P10 were obtained. Ion exchange water was added so that the total mass of the pretreatment liquid became 100 mass %. The components disclosed in Table 1 are as follows. In Table 1, the concentration of the multivalent metal salt included in the pretreatment liquid and the solid content concentration of the resin are matched and shown.

Calcium chloride (molecular weight: 110.99)
Calcium nitrate tetrahydrate (molecular weight: 236.14)
Magnesium chloride hexahydrate (molecular weight: 203.30)
Calcium acetate (molecular weight: 158.14)
Resin A (product name "NK-Binder R-5HN", manufactured by Shin-Nakamura Chemical Co., Ltd., solid content 44 mass %)
BYK-348 (product name, manufactured by BYK-Chemie Japan K.K., polysiloxane-based surfactant)
ion exchange water

TABLE 1

| Constitution of Pretreatment Liquid | | P1 | P2 | P3 | P4 | P5 | P6 | P7 | P8 | P9 | P10 |
|---|---|---|---|---|---|---|---|---|---|---|---|
| Multivalent Metal Salt | Calcium Chloride | 0.78 | 0.3 | 0.88 | | | | 0.78 | 0.22 | 1.4 | 0.78 |
| | Calcium Nitrate Tetrahydrate | | | | 1.6 | | | | | | |
| | Magnesium Chloride Hexahydrate | | | | | 1.4 | | | | | |
| | Calcium Acetate | | | | | | 1.1 | | | | |
| Resin | Resin A (solid content 44 mass %) | 1.02 | 1.02 | 1.02 | 1.02 | 1.02 | 1.02 | 7.95 | 1.02 | 1.02 | 0 |
| Surfactant | BYK-348 | 0.1 | 0.1 | 0.1 | 0.1 | 0.1 | 0.1 | 0.1 | 0.1 | 0.1 | 0.1 |
| Water | Ion Exchange Water | Remainder | Remainder | Remainder | Remainder | Remainder | Remainder | Remainder | Remainder | Remainder | Remainder |
| Total (Mass %) | | 100 | 100 | 100 | 100 | 100 | 100 | 100 | 100 | 100 | 100 |
| Multivalent Metal Salt (mol/kg) | | 0.070 | 0.027 | 0.079 | 0.068 | 0.069 | 0.070 | 0.070 | 0.020 | 0.126 | 0.070 |
| Solid Content Concentration (mass %) of Resin | | 0.45 | 0.45 | 0.45 | 0.45 | 0.45 | 0.45 | 3.5 | 0.45 | 0.45 | 0.45 |

3.2. Preparation of Ink Composition

After each component was mixed and stirred so as to have the blending ratios in Table 2, the composition was filtered with a metal filter with a pore diameter of 5 μm, subjected to a deaeration treatment with a vacuum pump, thereby obtaining the ink composition M. A pigment dispersion liquid (solid content concentration of 15 mass %) containing a pigment, a resin-dispersed pigment, and water is created in advance, and the pigment dispersion liquid and remaining components are mixed in the preparation of the ink composition. The numerical values in Table 2 indicate mass % and ion-exchanged water was added so that the total mass of the ink compositions became 100 mass %. The components disclosed in Table 2 are as follows.

Magenta dispersion liquid (contains 15 mass % of C.I. Pigment Red 122)
Takelac WS-6021 (product name, Mitsui Chemicals, Inc., urethane resin emulsion, self-emulsifying type, solid content 30%)
Glycerin
Triethylene glycol
2-pyrrolidone
Triethylene glycol monobutyl ether
BYK-348 (product name, manufactured by BYK-Chemie Japan K.K., polysiloxane-based surfactant)
ion exchange water

TABLE 2

| Constitution of Ink Composition | | M |
|---|---|---|
| Pigment Dispersion Liquid | Magenta dispersion Liquid (Solid Content 15 Mass %) | 27 |
| Resin | Takelac WS-6021 (Solid Content 30%) | 13.3 |
| Organic Solvent | Glycerin | 8 |
| | Triethylene glycol | 1 |
| | 2-pyrrolidine | 1 |
| | triethylene glycol mono-butyl ether | 1 |
| Surfactant | BYK-348 | 0.3 |
| Water | Ion Exchange Water | Remainder |
| | Total (mass %) | 100 |

3.3. Evaluation Test

The evaluation samples according to the examples and comparative examples used in the following evaluation tests were created as follows.

Pretreatment Step

A commercial available T-shirt cloth (product name "Hanes Heavyweight", manufactured by Hanesbrands Japan Inc., cloth color: white, material, 100% cotton) was prepared as the fabric, and the pretreatment liquid prepared as above was coated thereon using a commercially available roller so as to reach 20 g to 30 g per A4 area. After coating, a heat treatment was performed for 50 seconds at 170° C. with a heat press device. After the T-shirt cloth was heat pressed, whether any pretreatment liquid-derived coloring remained was evaluated. Whether the texture of the pretreated parts was worsened was further evaluated. The specific evaluation method is described below.

Ink Application Step (Printing)

The ink composition M prepared as above was attached with respect to the fabric after treatment with an ink jet method using an ink jet printer (product name, "PX-G930", manufactured by Seiko Epson Corp.), thereby printing the image. The printed pattern (image) was obtained by printing a solid pattern with a resolution of 1440×1440 dpi, setting the printing range to A4 size, and with a duty of 100%. The post-printing fabric was subjected to a heat treatment at the heating temperature and heating time in Table 3 using a heat press device, the ink composition was fixed to the fabric, and a fabric printed with the ink composition was obtained. The obtained fabric was evaluated for color unevenness, bleeding, color development, and color fastness to washing of the printed portion (image). The specific evaluation method is described below.

3.3.1. Color Change Due to Pretreatment

After the heat pressing (before printing) after pretreatment liquid coating, whether or not there is coloring derived from the pretreatment liquid on the T-shirt fabric was determined in the following manner.

I: No pretreatment liquid-derived coloring observed.
II: Pretreatment liquid-derived coloring observed on one of five printed sheets.
III: Pretreatment liquid-derived coloring observed on two or more of five printed sheets.

3.3.2. Changes in Texture Due to Pretreatment

After the heat press step (before printing) after the pretreatment liquid coating, changes to the texture of the pretreatment liquid-coated portion were determined in the following manner.

I: the feel of the pretreatment liquid-coated portion largely is unchanged compared to original fabric.
II: the feel of the pretreatment liquid-coated portion is slightly hardened.
III: the feel of the pretreatment liquid-coated portion is clearly hardened.

3.3.3. Color Unevenness, Bleeding

After printing, the color unevenness and bleeding of the printed portion (image) was visibly determined with respect to the T-shirt.

I: Almost no color unevenness or bleeding is noticeable.
II: Slight color unevenness or bleeding is noticeable (thin locations or parts with bleeding partially present).
III: Color unevenness or bleeding is noticeable (thin locations or parts with bleeding largely present).

3.3.4. Color Development of Printed Product

With respect to post-printing T-shirt, the OD value (color development density) of the printing portion (image) was measured with an i1-Pro spectral colorimeter by X-Rite Incorporated, and determination was performed based on this value in the following manner.

A: OD value is 1.3 or more.
B: OD value is 1.2 or more and less than 1.3.
C: OD value is less than 1.2.

3.3.5. Color Fastness to Washing of Printed Product

The color fastness to washing of the post-printing T-shirt was evaluated in accordance with "AATCC 61 2A", and determined in the following manner.

A: Color fastness to washing is grade 4 or higher.
B: Color fastness to washing is grade 3 to 4.
C: Color fastness to washing is grade 3 or lower.

3.4. Evaluation Result

The results of the above evaluation are shown in Table 3.

TABLE 3

| | | Example 1 | Example 2 | Example 3 | Example 4 | Example 5 | Example 6 | Example 7 | Example 8 |
|---|---|---|---|---|---|---|---|---|---|
| Pre-treatment—Textile Printing Conditions | Pretreatment Liquid Used | P1 | P2 | P3 | P4 | P5 | P6 | P1 | P1 |
| | Ink composition Used | M | M | M | M | M | M | M | M |
| | Concentration of multivalent | 0.07 | 0.027 | 0.079 | 0.068 | 0.069 | 0.07 | 0.07 | 0.07 |

TABLE 3-continued

|  |  |  |  |  |  |  |  |  |  |
|---|---|---|---|---|---|---|---|---|---|
|  | Metal Ions (mol/kg) |  |  |  |  |  |  |  |  |
|  | Attachment Amount of Multivalent Metal Salt ($\mu$mol/cm$^2$) | 3.5 | 3.5 | 3.5 | 3.5 | 3.5 | 3.5 | 3.5 | 6 |
|  | color Ink Attachment Amount (mg/cm$^2$) | 3.7 | 3.7 | 3.7 | 3.7 | 3.7 | 3.7 | 3.7 | 3.7 |
|  | Post-Printing Heating Conditions | 170° C. 50 s | 170° C. 50 s | 170° C. 50 s | 170° C. 50 s | 170° C. 50 s | 170° C. 50 s | 160° C. 80 s | 170° C. 50 s |
|  | Attachment Amount of Pretreatment Liquid (g/cm$^2$) | 0.0500 | 0.1296 | 0.0443 | 0.0515 | 0.0507 | 0.0500 | 0.0500 | 0.0857 |
| Evaluation Results | Coloring due to pretreatment | I | I | I | II | I | I | I | I |
|  | Change texture due to pretreatment | I | I | I | I | I | I | I | I |
|  | Color unevenness—Bleeding | I | I | I | I | I | I | I | II |
|  | Color development | A | B | A | A | B | A | A | A |
|  | Color Fastness to Washing (AATCC61 2A) | A | A | B | A | A | A | B | B |

|  |  | Example 9 | Example 10 | Example 11 | Example 12 | Comparative Example 1 | Comparative Example 2 | Comparative Example 3 | Comparative Example 4 |
|---|---|---|---|---|---|---|---|---|---|
| Pre-treatment— Textile Printing Conditions | Pretreatment Liquid Used | P1 | P1 | P7 | P10 | P8 | P9 | None | P9 |
|  | Ink composition Used | M | M | M | M | M | M | M | M |
|  | Concentration of multivalent Metal Ions (mol/kg) | 0.07 | 0.07 | 0.07 | 0.07 | 0.02 | 0.126 | — | 0.126 |
|  | Attachment Amount of Multivalent Metal Salt ($\mu$mol/cm$^2$) | 1.5 | 3.5 | 3.5 | 3.5 | 1.6 | 11 | 0 | 2.2 |
|  | color Ink Attachment Amount (mg/cm$^2$) | 3.7 | 5 | 3.7 | 3.7 | 3.7 | 3.7 | 3.7 | 3.7 |
|  | Post-Printing Heating Conditions | 170° C. 50 s | 170° C. 50 s | 170° C. 50 s | 170° C. 50 s | 170° C. 50 s | 170° C. 50 s | 170° C. 50 s | 170° C. 50 s |
|  | Attachment Amount of Pretreatment Liquid (g/cm$^2$) | 0.0214 | 0.0500 | 0.0500 | 0.0500 | 0.0800 | 0.0873 | — | 0.0175 |
| Evaluation Results | Coloring due to pretreatment | I | I | I | I | I | I | I | I |
|  | Change texture due to pretreatment | I | I | II | I | I | I | I | I |
|  | Color unevenness—Bleeding | II | II | I | I | I | I | I | III |

TABLE 3-continued

| | | | | | | | | |
|---|---|---|---|---|---|---|---|---|
| Color development | B | A | A | A | C | A | C | B |
| Color Fastness to Washing (AATCC61 2A) | A | B | A | B | A | C | A | A |

As shown in Table 3, if a pretreatment liquid in which the concentration of the multivalent metal salt is in a range of 0.025 mol/kg or more and 0.08 mol/kg or less is used, it is demonstrated that it is possible for an image with excellent color development and color fastness to washing to be recorded. In Example 4, coloring derived from the pretreatment liquid was observed on the T-shirt fabric due to the calcium nitrate included in the pretreatment liquid. In Example 6, odor was detected due to the calcium acetate included in the pretreatment liquid.

Slight bleeding of the image occurred in the evaluation sample according to Example 8. It is thought that the drying properties of the pretreatment liquid are lowered by the coating amount of the pretreatment liquid being increased. Slight color unevenness of the image occurred in the evaluation sample according to Example 9. It is thought that the uniformity of coating of the pretreatment liquid is lowered by the coating amount of the pretreatment liquid being reduced. Slight bleeding of the image occurred in the evaluation sample according to Example 10. It is thought that the drying properties of the recorded image are lowered by the attachment amount of the ink composition being increased. The evaluation sample of Example 11 has a slightly hardened texture of the fabric. It is thought that the texture of the fabric is lowered along with an increase the resin included in the pretreatment liquid.

In Comparative Example 1, it is demonstrated that the color development of the recorded image is lowered because a pretreatment liquid with a concentration of multivalent metal salt of less than 0.025 mol/kg was used. In Comparative Example 2, it is demonstrated that the color fastness to washing of the recorded image is lowered because a pretreatment liquid with a concentration of multivalent metal salt exceeding 0.08 mol/kg was used. In Comparative Example 3, it is demonstrated that the color development of the recorded image is lowered because the pretreatment was not performed. In Comparative Example 4, a pretreatment liquid in which the concentration of the multivalent metal salt exceeds 0.08 mol/kg was used, and the attachment amount of the pretreatment liquid was reduced. As a result, it was difficult to uniformly coat the fabric with the pretreatment liquid, and color unevenness and bleeding occurred in the recorded image.

The invention is not limited to the embodiments described above, and various modifications thereof are possible. For example, the invention includes configurations which are substantially the same as the configurations described in the embodiments (for example, configurations having the same function, method and results, or configurations having the same purpose and effect). The invention includes configurations in which non-essential parts of the configurations described in the embodiments are replaced. The invention includes configurations exhibiting the same operation and effect as the configurations described in the embodiments or configurations capable of achieving the same object. The invention includes configurations in which known techniques were added to the configurations described in the embodiments.

The entire disclosure of Japanese Patent Application No.: 2014-036545, filed Feb. 27, 2014 is expressly incorporated by reference herein.

What is claimed is:

1. A pretreatment liquid for ink jet textile printing used by being applied to a fabric before applying an ink composition for ink jet textile printing to the fabric, the pretreatment liquid comprising:
    a multivalent metal salt; and
    an aqueous medium,
    wherein a concentration of the multivalent metal salt has an absolute molecular mass in a range of 0.025 mol/kg or more to 0.06 mol/kg or less,
    wherein the multivalent metal salt is selected from one of calcium chloride and calcium acetate, and
    wherein the attachment amount of the pretreatment liquid is in a range of 0.02 g/cm$^2$ or more to 0.5 g/cm$^2$ or less.

2. The pretreatment liquid for ink jet textile printing according to claim 1, wherein metal ions that configure the multivalent metal salt are at least one of calcium ions and magnesium ions.

3. The pretreatment liquid for ink jet textile printing according to claim 1, wherein anions that configure the multivalent metal salt are chlorine ions.

4. The pretreatment liquid for ink jet textile printing according to claim 1, wherein a content of resin is 3.5 mass % or less.

5. A textile printing method, comprising:
    applying the pretreatment liquid according to claim 1 to at least a partial region of a fabric; and
    applying an ink composition for ink jet textile printing to at least a portion of the region to which the pretreatment liquid is applied.

6. A textile printing method, comprising:
    applying the pretreatment liquid according to claim 2 to at least a partial region of a fabric; and
    applying an ink composition for ink jet textile printing to at least a portion of the region to which the pretreatment liquid is applied.

7. A textile printing method, comprising:
    applying the pretreatment liquid according to claim 3 to at least a partial region of a fabric; and
    applying an ink composition for ink jet textile printing to at least a portion of the region to which the pretreatment liquid is applied.

8. A textile printing method, comprising:
    applying the pretreatment liquid according to claim 4 to at least a partial region of a fabric; and
    applying an ink composition for ink jet textile printing to at least a portion of the region to which the pretreatment liquid is applied.

9. The textile printing method according to claim 5, further comprising:
    heating the ink composition applied to the fabric.

10. The textile printing method according to claim 9, wherein the heating temperature in the heating is 160° C. or more and 200° C. or less.

11. The textile printing method according to claim 5, wherein the attachment amount of the multivalent metal salt included in the pretreatment liquid applied to the fabric is 1.6 µmol/cm² or more and 6 µmol/cm² or less.

12. The textile printing method according to claim 5, wherein the method is performed using a fabric with a brightness (L*) of 70 or more.

13. The textile printing method according to claim 5, wherein the attachment amount of the ink composition applied to the fabric is 1.5 mg/cm² or more and 6 mg/cm² or less.

14. The textile printing method according to claim 5, wherein the ink composition contains a coloring material other than a white coloring material.

15. The textile printing method according to claim 1, wherein the viscosity of the pretreatment liquid at 20° C. is 30 mPa·s or less.

16. The pretreatment liquid for ink jet textile printing according to claim 1, wherein the concentration of the multivalent metal salt is within a range of 0.04 mol/kg or more and 0.06 mol/kg or less.

* * * * *